INVENTOR.
EVERETT R. BISHOP
VINCENT A. LABELLA
BY Michael Masnik
THEIR ATTORNEY

PROGRAM Q001

PROGRAM Q002

PROGRAM Q003

TOOL INDEX

T01 - ¼" DIA. PUNCH
T02 - ½" DIA. PUNCH
T03 - 2" DIA. PUNCH
T04 - 2" SQ. PUNCH

INVENTOR.
EVERETT R. BISHOP
VINCENT A. LABELLA
BY Michael Masnik
THEIR ATTORNEY

United States Patent Office 3,562,715
Patented Feb. 9, 1971

3,562,715
REPEAT PATTERN CONTROL FOR
AUTOMATIC MACHINES
Everett R. Bishop, Waynesboro, Va., and Vincent A.
Labella, Broomall, Pa., assignors to General Electric
Company, a corporation of New York
Filed Nov. 15, 1967, Ser. No. 683,318
Int. Cl. G05b 19/00
U.S. Cl. 340—172.5
12 Claims

ABSTRACT OF THE DISCLOSURE

An arrangement for operating on an object with an automatic machine under control of command data stored in a plurality of record mediums. The data includes data representing a plurality of offset positions from a zero reference position, and identification codes for selecting desired ones of a plurality of patterns of control to be executed at desired departure points from each of the offset positions. Means are provided for reading the command data from a first record medium in sequence, selecting the data corresponding to desired ones of the patterns of control which are stored in a second record medium, and then combining the offset data from the first record medium and pattern data from the second record medium to provide resultant data which controls operation of the automatic machine on the object.

BACKGROUND OF THE INVENTION

Field of invention

This invention relates to a new and improved control system for controlling the operations of a machine moving member on an object.

More particularly, the invention relates to a novel arrangement for automatically executing the same or different operations by the machine moving member at the same or different locations on an object.

Brief description of prior art

There are many known manufacturing procedures employing automatically, or semiautomatically controlled machine tools where it is necessary to carry out a number of machining operations at different spaced-apart positions or locations on an object being worked on, or a work member. These machining operations may involve drilling, tapping, boring, punching, turning, cutting, or any other similar operation which automatically controlled machine tools are capable of performing.

In the past, this problem has been solved through the use of a single record reader such as a punched tape reader and a single record medium. In this known arrangement the tape reader operates on a length of tape which contains positioning information where all of the machining operations are to be conducted plus the machining operation data. One complete pass of this tape through the reader results in the machining of the work member. While this known technique works satisfactorily, it requires a completely new tape for each new job and is expensive of programming time. Other known arrangements suffer from these or similar shortcomings.

SUMMARY OF THE INVENTION

In accordance with one embodiment of the present invention, the disadvantages of the known techniques described above are overcome by carrying out all of the desired operations through an improved process of matching and combining the positioning information and the machining operation data.

It is therefore a primary object of the present invention to provide an improved control arrangement which will execute a pattern of machining operations at different positions on a work member. This is achieved by storing the various pattern dimensions and machining instructions on a first record member, and the position data for each of the N positions along with suitable addresses or codes identifying the desired pattern for each $Nth$ position on a second record member or medium. Such a medium may constitute, without limitation, punched or magnetic tape in the form of a loop, or an open length or sheet of recording material with provisions for rewind. The record media are sequentially read by corresponding record readers (such as a punched tape reader) and the read data is processed before being employed to execute the desired patterns of machining operations.

AUTOMATIC ALPHANUMERIC CONTROL METHOD AND APPARATUS

It is therefore a primary object of the present invention to provide a new and improved control method and apparatus for performing automatic alphanumeric control of a process or machine with machine read prestored instruction programs which represent the different control operations to be performed at the various locations on the workpiece.

Another object of this invention is to provide a new and improved dual reader control method and apparatus for performing automatic alphanumeric control of a process or machine with offset information stored in a first record medium and a library of control operation data stored in a second record medium.

Another object of the invention is to provide such a dual reader control method and apparatus which substantially reduces the volume of tape required and the program time required to continuously perform the various automatically controlled operations.

Other objects, features and many of the attendant advantages of this invention will be better understood after a reading of the following detailed description when considered in connection with the accompanying drawings; wherein like parts in each of the several figures are represented by the same reference character.

DETAILED DESCRIPTION OF INVENTION

Figure 1:
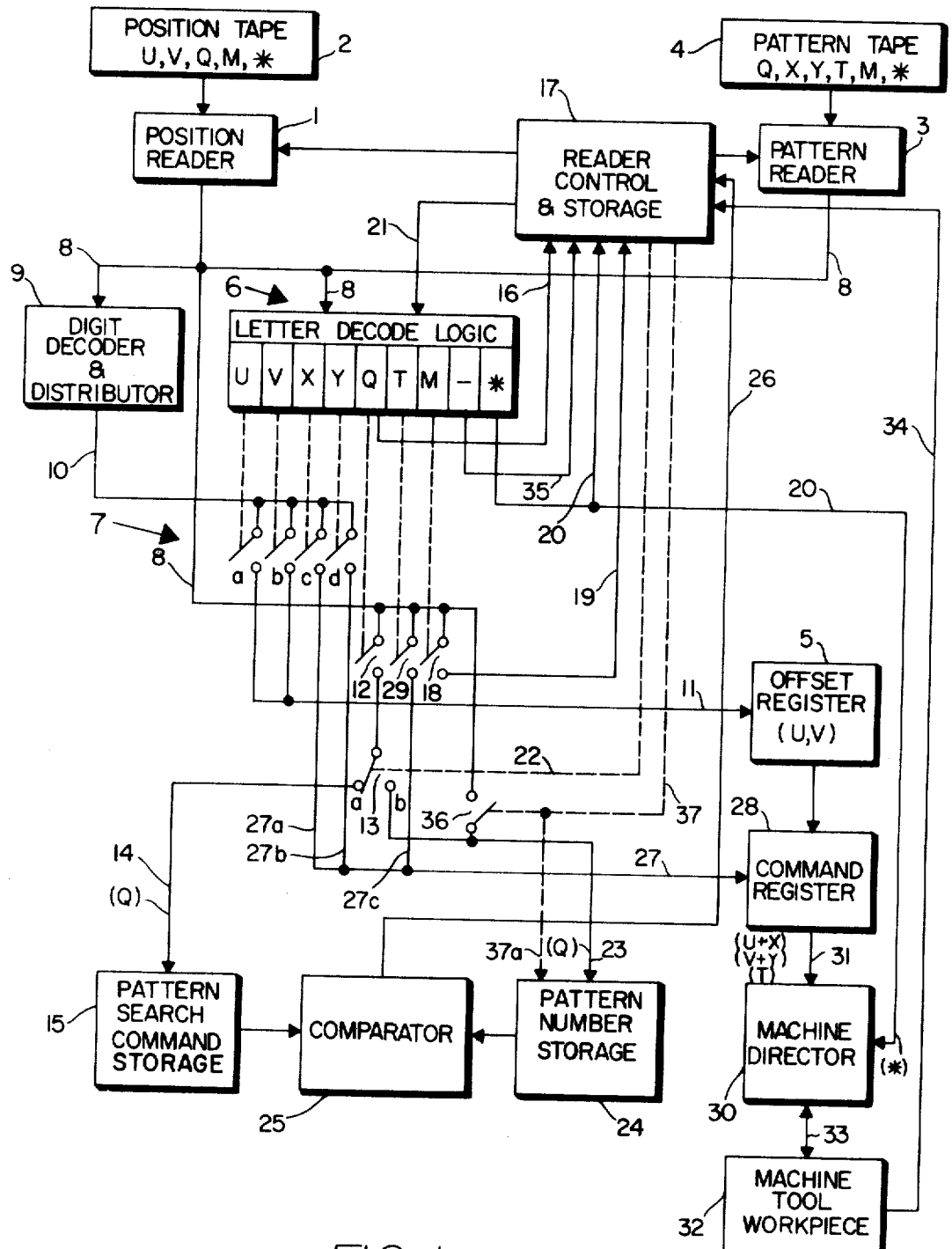
FIG. 1 illustrates in block diagram form one embodiment of the invention.

The invention will now be described in terms of an arrangement which would enable a numerically controlled machine tool control to repeat many standard manufacturing routines as many times as necessary at different dimensional locations on the same workpiece. Any desired number of routines could be accommodated. Also, the position of location could be anywhere on the work surface of the machine. Essentially there is no limit to the number of times the same manufacturing routine could be repeated. Referring to FIG. 1, two tape readers are provided. A first tape reader 1, which we shall call the position reader, is used to read the various position or location information stored in alphanumeric form in a storage medium, such as the magnetic record medium 2. A second reader 3, referred to as the pattern reader, is caused to search the patterns of control stored in alphanumeric form in the pattern record medium 4. Auxiliary functions are provided which will be described that enable the numerical control unit to select the proper tape reader at the proper time by tape. In the embodiment to be described, the tape programmable zero offset was provided for the two axes X and Y for purposes of discussion although this concept is not necessarily limited to this number of controlled axes. The letter addresses U and V were selected and used in the position data to indicate the tape programmable position offset for the X and Y axes respectively for the particular pattern desired which is also identified by the letter Q followed by three digits. Tape search can be extended to accommodate as many separate patterns of control as may be desired by increasing the number of address digits. A command from the position data reader with a Q address and three digits will cause the pattern control reader to search forward for the indicated address or identification. Searching in the reverse direction is accomplished by a minus sign before the three digits.

Figure 3A:
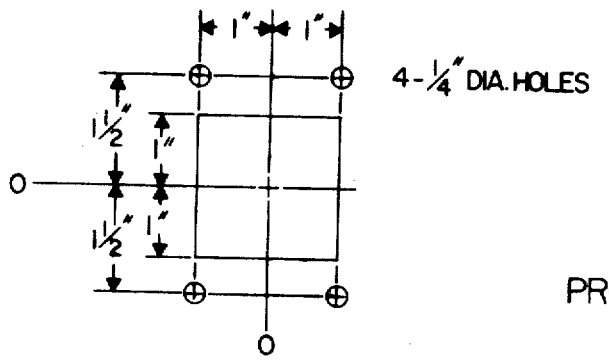
FIGS. 3A, 3B, and 3C illustrate in graphical form the various machining patterns which can be selected for execution upon the work member.
Figure 3B:
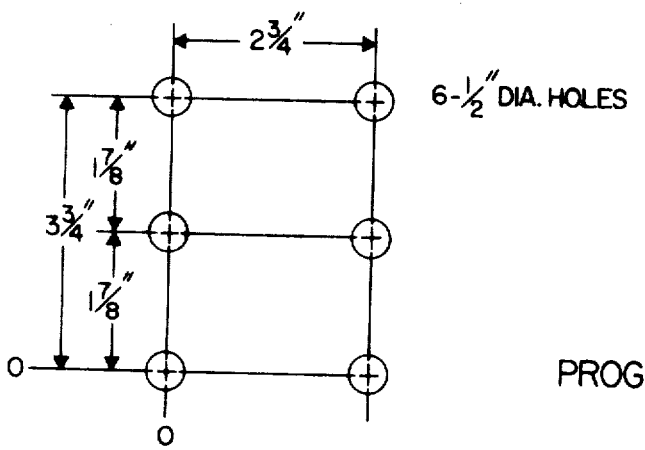
Figure 3C:
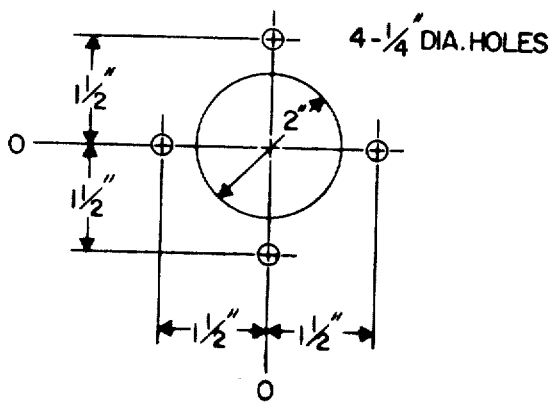

With these concepts in mind it is now relatively simple to provide an illustration of the invention involving dual readers and dual tapes. For our illustration we will discuss three separate patterns of control which will be repeated on the same workpiece. There is, of course, no limit to the number of times any pattern may be repeated in the same part. In fact the more the repetition, the greater the advantages of the system. The three patterns are shown in FIGS. 3A, 3B, and 3C. These are recorded on the pattern tape and made available for machining purposes upon recall or reading by a pattern tape reader. In essence, the pattern tape constitutes a library of available control patterns. Essentially the pattern 3A represents a square punch with four circular punches. Pattern 3B represents a pattern of six circular punches and pattern 3C represents a larger circular punch with four smaller circular punches.

Figure 2:
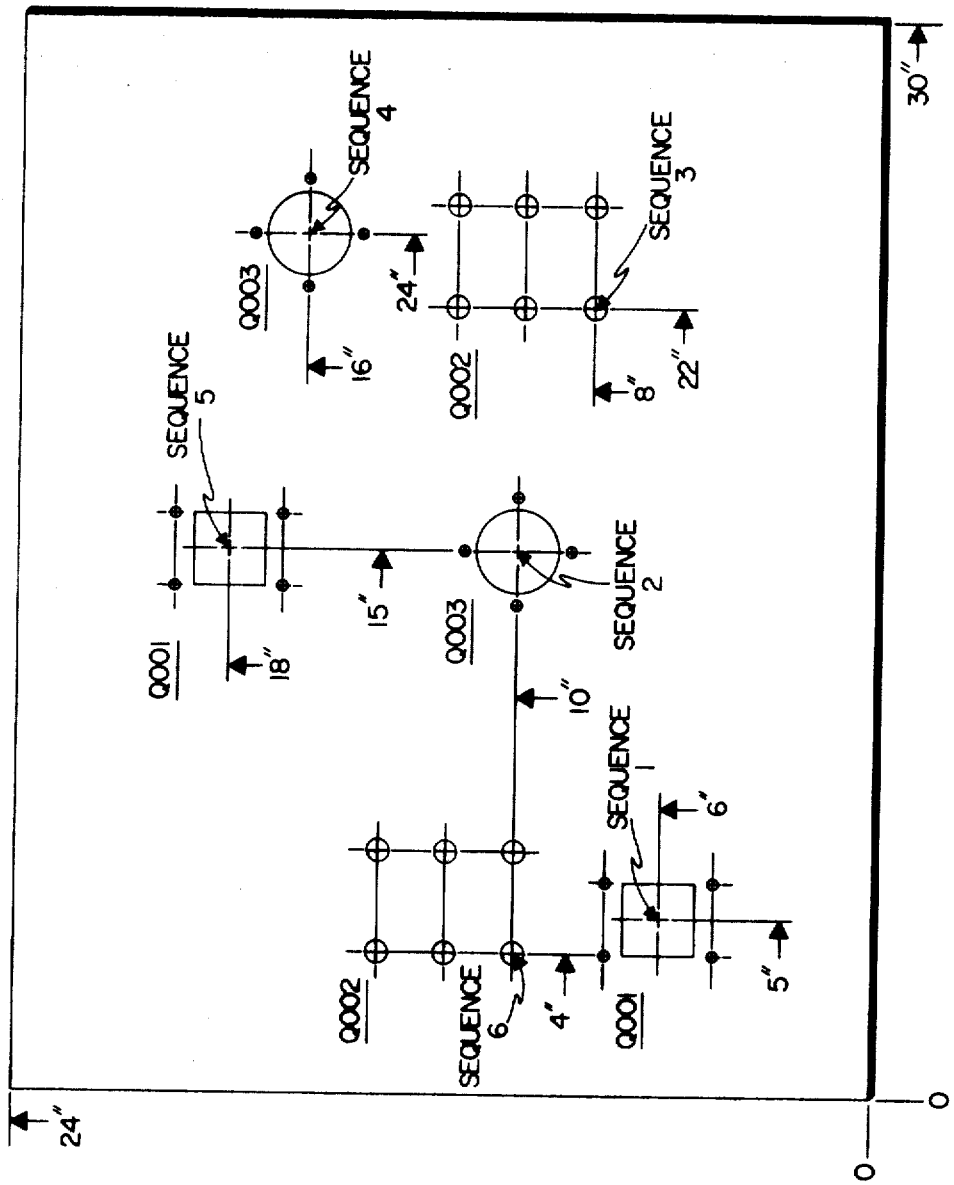
FIG. 2 is a plan view of the surface of a work member or object upon which a series of machining patterns are to be executed and are offset from various reference locations on the surface of the work member in either the X-axis and/or the Y-axis direction by given sets of offset dimensions.

In the example we have selected, the operation performed on the workpiece appears as in FIG. 2. All of the patterns of FIGS. 3A, 3B, and 3C are repeated twice on the same workpiece but at different locations.

The program associated with each of the patterns shown in FIGS. 3A, 3B, and 3C and stored in the storage medium can be identified in alphanumeric form as follows:

Key:

* =end of block code
Q=pattern code letter
X=X coordinate pattern code letter
Y=Y coordinate pattern code letter
T=Tool code letter
U=X coordinate offset position code letter
V=Y coordinate offset position code letter
M=miscellaneous code letter
M08=initiate search of pattern tape for specified program
M09=pattern program complete—return to position tape for next instruction
M02=end of complete part program Pattern tape program:

Q 001*
X 00000 Y 00000 T 04*
X–01000 Y–01500 T 01*
X 01000*
Y 01500*
X–01000*
M 09*
Q 002*
X 00000 Y 00000 T 02*
X 02750*
Y 01875*

Pattern tape program:

Y 03750*
X 00000*
Y 01875*
M 09*
Q 003*
X 00000 Y 00000 T 03*
Y–01500 T 01*
X 01500 Y 00000*
X 00000 Y 01500*
X–01500 Y 00000*
M 09*

The program establishing the positions on the workpiece where selected patterns of control are to be executed together with an identification of such patterns can be identified in alphanumeric form as follows.

Position tape program:

U 05000 V 06000 Q 001 M 08*
U 15000 V 10000 Q 003 M 08*
U 22000 V 08000 Q–002 M 08*
U 24000 V 16000 Q 003 M 08*
U 15000 V 18000 Q–001 M 08*
U 04000 V 10000 Q 002 M 08*
M 02*

The program information is stored in the record medium in any desired form, for example in the case of punched paper tape, the letters and numbers appear as coded arrangements of punched holes wherein each of the different arrangements represents a particular letter or number.

An analysis of the position tape programs indicates the patterns are to be executed in the sequences 1–6 indicated on FIG. 2. The offset position for the first sequence is defined as U 05000 V 06000 which represents the center of the large square. The address Q 001 indicates that the pattern FIG. 3A is called for. The address M 08 initiates the start of search by the pattern reader which searches the pattern tape until the Q 001 code is detected. The Q 001 instruction following the Q 001 identifying code states that the first departure to be algebraically combined with the previously read and stored "U, V" offset position (sequence 1), is X 00000 Y 00000, or that the center of the first operation coincides with the first offset position. T 04 indicates that the 2-inch square punch is to be selected (for example by tool turret movement). Table and turret positioning takes place after reading the end of block code and the machining operation is executed. Upon receipt of a signal from the machine that the machining operation has been executed, the position tape reader is caused to read the second pattern command associated with the Q 001 pattern of control. The X–01000 Y–01500 represent a departure from the first offset position which is stored and algebraically combined with the first reference position data. The combination represents the center of the lower left-hand corner circle of sequence 1 FIG. 2. T 01 indicates that a one-quarter inch diameter punch is to be selected. Upon reading of the end of block, the work table and selected punch are moved and caused to execute the lower left-hand circle of sequence 1 (FIG. 2). The balance of the Q 001 program can be similarly analyzed. Where a specific instruction is omitted from a command, its specified value taken from the most recent previous command is repeated. For example, the third command associated with Q 001 appears as X 01000. This means that Y–01500 and T 01 of the previous command are repeated. The M 09 code indicates end of pattern. Therefore, upon reading the end of block signature, the position reader is again caused to read the next (second) sequence (FIG. 2) position information defined as U15000 V10000 Q003 M 08. In this manner, the complete machining operation is defined. The Q– represents a search of the pattern tape in the minus or opposite direction from that associated with Q. The M 02 indicates the end of the position tape operation and therefore the end of the machining operation. The subsequent end of block code stops numerical control operation.

We will now describe the method of operation of the arrangement of FIG. 1 to execute the patterns of FIGS. 3A, 3B and 3C to produce the results shown in FIG. 2.

The operation commences with the operator initiating the start button in position reader 1. The position reader 1 reads the information stored in the position tape 2 into the letter decode logic circuitry 6. It is the function of this circuit to recognize the various letters being read by reader 1 (and 2 as we shall discuss shortly) and initiate various actions related to the letter recognized. Thus, for example, the reader output corresponding to the letter U is applied over channel 8 to the circuitry 6. Circuit 6 identifies the reading of U, as for example by appropriately coded AND gates, and causes normally open switch 7a to close for a period of time sufficient to store the value of the number following the letter U in the offset register 5. The value of U, for example in the form of punched holes in a tape representing the number 05000, is then read and applied over channel 8 to the digit decoder and distributor circuit 9 where the digital information available in parallel form on channel 8 is converted into digital information available in serial form on lead 10. Switch 7a having been closed because of the previous recognition of the letter U, the serial information is applied over channel 11 to the offset register 5 where its value is stored. Thus the output of the digit decoder 9 during the first time interval would be no pulses, then five pulses, then in each of the subsequent three intervals there would be no pulses furnished. The offset register receives these pulses and stores them. Each of the digits represented by a corresponding number of pulses, is counted into the corresponding digit stages of decade counters. In a similar manner, the circuit 6 recognizes the letter V, closes the switch 7b and causes the value of V, say 06000, to be stored in the offset register 5.

After U and V have been recognized and their values stored, the letter Q is recognized causing the normally open 12 to close. Closing of 12 permits the subsequent value of Q, available on lead 8, to be applied over normally closed contact 13 and channel 14 to the pattern or Q search command storage unit 15. Also, upon recognition of the letter Q, a signal is applied over lead 16 to the reader control 17 to enable the subsequent performance of a search function to be described later. The Q value stored in 15 is available as states of a register for comparison with other signals in connection with the search function.

Upon recognition of the letter M by 6, switch 18 is closed permitting the value of M then to be applied over channel 8, switch 18 and channel 19 to the reader control 17. The value of M stored in reader control 17, that is 08 in the example shown, is used to enable the subsequent operation of pattern reader 3 by subsequent commands. Upon recognition of the end of block symbol, circuit 6 generates a signal which is applied over channel 20 to the reader control 17 to execute the previously conditioned commands of switching readers and initiating searching associated with previously recognized Q and M commands. That is, reader 1 is switched off, reader 3 is switched on, and by means of 22, switch 13 is moved to open path 13a and close 13b. The latter permits information to be routed to 24 instead of 15.

When switched, pattern reader 3 reads the data stored on the tape 4. The circuit 6 successively recognizes the various Q signals to permit comparison with the pattern search command stored in 15. Circuit 6 is conditioned by a control signal applied over channel 21 from the reader control 17 in response to the previous end of block signal and the prior Q command, to prevent the circuit 6 from responding to anything but Q signals until after the search for commanded Q function is completed. Thus, during this inhibit period, the various Q letters are recognized by the circuit 6 and switch 12 closed permitting the corresponding values of Q to be applied over channel 8, closed switches 12 and 13b to the pattern number storage unit 24. Here it is stored as information in the states of a storage register. Circuit 24 operates in response to reading in of the last digit of the Q value to cause a comparison between the values stored in 15 and 24 by comparator unit 25, such as a bit comparator. Thus the bit comparator successively compares at appropriate times the Q values being stored in 24 with the commanded Q value previously stored in 15 and produces an output only when there is an identity, whereupon a signal is delivered over channel 26 to the reader control 17. Reader control 17 responds to this last mentioned signal to remove the inhibit signal available on channel 21 to permit the circuit 6 to identify codes other than the Q codes. Thereupon circuit 6 recognizes the next letter X and closes circuit 7c permitting the X departure values available from the digit decoder 9 on channel 10 to be applied through 7c and channel 27 to command register 28 where its numerical value is added to that of U previously stored in offset register 5 and the sum stored in the command register which may comprise for example decade counters to facilitate the addition. In a similar manner, the Y letter is detected and the contact 7d closed permitting the Y departure values from decoder and distributor 9 to be applied over channel 27 to register 28 where Y's numerical value is added to that of V previously stored in offset register 5 and the sum stored in command register 28. If the next letter is a T, this is also recognized by circuit 6 which causes the closing of normally open contacts 29 for a period of time sufficient to permit the application of the T values over channel 8 and channel 27 for storage in the register 28.

In our example relating to the first sequence, there is no M letter available at this time and so the circuit 6 detects the end of block character which causes a signal to be delivered over channel 20 to the machine director 30.

Register 28 is so arranged that in applying the departure values of X and Y to the register 28, they are algebraically combined with U and V to produce $U+X$ and $V+Y$ information available for application over channel 31 to the machine director 30. The application of the end of block signal over channel 20 to machine director 30 indicates that the first block of selected pattern data is available for control purposes. Thereupon the $U+X$, $V+Y$ and T departure data and tool identification data is transferred to the machine director 30 to correspondingly control the operation of the machine tool on the workpiece. The numerical positioning control represented by 30 and 32 operates in a well known manner and may comprise a standard type of numerical positioning control such as described in Pat. No. 3,291,970 entitled "Automatic Control Apparatus" dated Dec. 13, 1966 and issued to J. T. Evans et al. While a particular combination of apparatus has been seletced to facilitate the ease of explanation of the invention, it is recognized that some of the circuitry such as registers, etc. already exist in the standard Numerical Control and may be used in performing the pattern searching and selecting.

Upon recognition of the end of the block character, a control signal is also applied over channel 20 to the reader control 17 to cause the pattern reader 3 to stop reading. Upon completion of the commanded machining operation under control of 30 (representing completion of a sequence 1 a completion signal is applied over channel 34 to the reader control 17. Pattern reader 3 is commanded to read the next block of data associated with the previously selected Q pattern. In this manner the successive blocks of data associated with the previously selected Q pattern causes the director to command the machine tool to perform the required machining operation. Finally the M09 signal associated with the completion of the commanded pattern is recognized by the circuit 6. Recognition of the character M causes the closing of contact 18 which permits the following M value, namely 09 to be applied over channel 8, switch 18, and channel 19 to the reader control 17. Control 17 responds to this 09 signal to switch reading from the pattern reader 3 to the position reader 1. Upon receipt of the end of block character following the M09 data, the next command is read from position tape 2 establishing the new set of offset commands U, V and the desired Q pattern Q003. The search procedure is then initiated for Q003 and upon location of the commanded pattern the associated departure data, tool commands, etc. are executed as previously described.

It should be noted that some of the Q values on the tape 2 are preceded by a negative sign. This indicates that the pattern reader 3 is commanded to search in a first, say reverse direction from that previously assumed as being the positive direction. The negative symbol when recognized by the circuit 6 is utilized to enable the pattern reader to continue reading in the reverse direction until the commanded Q value and its address have read and the Q address is recognized by a comparison of the information stored in units 15 and 24. When the commanded Q pattern on tape 4 has been so recognized, a signal is furnished by comparison unit 25 over channel 26 to the reader control 17 which commands the pattern reader 3 then to search in the forward direction. The search in the negative direction is designed to allow for overshoot such that upon a change of the reading to a second direction, or forward, the desired Q pattern may be searched for in the second or forward direction until an identity is obtained. The operation otherwise is identical to that previously described for a positive search.

The manner in which the negative direction search is executed will now be described in greater detail. Upon recognition of the associated Q letter, contact 12 is closed and a search enabling signal is supplied over channel 16 for storage in reader control 17. Upon recognition of the negative symbol by circuit 6, a control signal is applied over channel 35 to reader control 17 and stored to enable subequent rewind search, closure of normally open switch 36 (which is to occur after reading of the end of block signal) and modification of the order in which data is accepted by 24. Closure of contact 12 permits the value of Q to be applied over channel 8, switches 12 and 13a to unit 15 where it is stored. Recognition of the M letter causes closure of normally open switch 18 which permits the value of M to be applied over channels 8 and 19 to the reader control 17 where it is stored to effect subsequent switching of readers and closure of switch 13 to 13b. Upon recognition of the end of block signal, an initiating signal is delivered over channel 20 to reader control 17. Upon receipt of the initiating signal, the previously stored Q and M values cause reader 3 to commence reading. The direction of reading is in reverse as commanded by the previously stored negative symbol. Switch 13 is closed to 13b, switch 36 is closed by the control exercised over 37 and storage unit 24 has its input stages modified by control exercised over 37a to accept data over channel 23 in a different order than usual, i.e. where no neagtive symbol recognition is involved.

To initiate control operation by reader control 17 after reading each end of block signal while permitting director 30 to operate only in the event an X, Y, or T letter was recognized by circuit 6 during reading of the last block of data, the duration of the control signal supplied to channel 20 is changed. Normally the initiate signal delivered over channel 20 is of short duration and insufficient to actuate director 30 but sufficient to actuate control 17. In response to such recognition of an X, Y or T letter, logic circuit 6 delivers an end of block signal having a longer duration sufficient to permit the execution of the complete machining operation commanded by the data furnished over channel 31.

However, since in our analysis, the last block of data was read from tape 2, no such X, Y or T letter was recognized by 6 and therefore director 30 remains inoperative. Reader 3 now reads in the reverse direction. For example, if the data read in the forward direction were Q 002, when read in the reverse direction it would be received by units 6 and 9 as 200 Q. For purposes of explanation let us assume that data other than 200 Q is read by 3 and appears on channel 8. Any letter X, Y, T, M or * is applied over closed switch 36 to storage unit 24. Unit 24 does not store any letter data and is designed to reset all registers to zero upon detection of a letter. The detection may be achieved with coded AND gates which generate a reset signal. It should be noted that units 15 and 9 respond to letters in a similar manner. Any digit associated with the value of a letter is also passed through closed switch 36 to unit 24 and stored. However, since a control signal had been applied over 37a, the digits associated with any letter are stored not in the order received, but in the reverse order. That 200 would be stored as 002. Upon recognition of the letter Q, an enabling signal is delivered over channel 16 to control 17. If just previous to this, the pattern search command value stored in 15 was also read and stored in 24 (in reverse order from that received) then a control is supplied by 25 over channel 26 to control 17. Since the search function is not completed, the recognition of the commanded Q value on tape 2 terminates only the rewind search. That is, circuit 6 remains inhibited from reading other letters. The reader control now responds to the control signal on 26 causing a reversion to a search in the forward direction. It also causes switch 36 to open and pattern storage unit to store digits as received (i.e. without modification) by a signal applied on channel 37 and 37a. The search in the forward direction is as previously described until an identity is established by comparator 25. Then by a signal developed over 21, as previously described, the recognition of other letters by 6 is permitted.

An improved signal processing arrangement and method has been described. The arrangement and method have particular application to controlling a machine moving member, such as a machine tool control, to perform machining operations on a workpiece. In particular, there is stored a plurality of first data each comprising a block of offset data representing points offset from a zero reference on a workpiece and a pattern address identifying the particular pattern of machining operations to be executed. Means are also provided for storing a plurality of second data each comprising an address identifying a particular pattern of machining operations and a plurality of blocks of data wherein each block comprises positional departures from an offset point and the tool to be employed. A first reader is provided for successively reading each of said first data. A second reader is provided for reading the second data and performing certain operations between successive readings of said first data. When a read second data pattern address corresponds to the last read first data pattern address a control signal is developed. This control signal then effects successive utilization of each block of data corresponding to the second data read address. This involves algebraically combining the last read data offsets with the departures of each block to produce a resultant offset. These resultant offsets are then successively applied together with the tool data corresponding to each block to the director. The director responds to the successively applied resultant offsets and tool data to control the machine moving member to effect the desired machining operations on the workpiece.

While in the block diagram FIG. 1 certain signal channels and switching functions are represented by single lines or single pole switches it should be understood that this is only a symbolic representation and that actual channels of communications and switching means may consist of a plurality of discrete electrical paths as required for example when the intelligence to be transmitted is in parallel form.

While the principles of the invention have now been made clear in the illustrative embodiment, there will be immediately obvious to those skilled in the art many modifications in structure, arrangement, proportions, the elements, materials and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed as new and desired to be secured by Letters Patent of the United States is:

1. An arrangement for controlling a machine moving member with respect to a workpiece comprising a machine director;
   means for storing a plurality of first data each comprising a block of separate offset data representing points offset from a zero reference on a workpiece and a pattern address identifying the particular pattern of machining operations to be executed;
   means for storing a plurality of second data each comprising an address identifying a particular pattern of machining operations and a plurality of blocks of data wherein each block comprises positional departures from an offset point and the tool to be employed;
   means for successively reading each of said first data;
   means for reading said second data and performing machining operations identified by said stored second data between successive readings of said first data comprising, means responsive to a second data read pattern address corresponding to the last read first data pattern address for producing a control signal;
   means responsive to said control signal for successively utilizing each block of data corresponding to said second data read address comprising, means for algebraically combining said last read first data offsets with the departures of each block of second data to produce a resultant offset;
   and means for successively applying said resultant offset and the tool data corresponding to each block to said director;
   said director responsive to said successively applied resultant offsets and tool data to control said machine moving member with respect to said workpiece.

2. An arrangement according to claim 1 wherein said first data further comprises a direction address identifying a first or second direction in which the stored second data is to be read;
   means responsive to a reading of a first data direction address representing said first direction for causing said second data reading means to read first in said first direction until a second data pattern address and associated blocks of data is read which corresponds to the last read first data pattern address and then reading in the second direction;
   said means for producing a control signal responsive to a second data pattern address reading in the second direction for producing said control signal.

3. An arrangement for controlling a machine moving member with respect to a workpiece comprising a machine director,
   a source of a plurality of first data each comprising separate first position data representing a respective position point and a first address calling for a particular set of departure data to be combined with said first position data;
   a source of a plurality of second data each comprising an address labelling a particular set of departure data and the corresponding set of departure data associated therewith;
   means for successively receiving each of said first data;
   means for successively receiving each of said second data for combining departure data and first position data between successive receptions of said first data comprising, means responsive to a received second data address corresponding to the last received first data address for producing a control signal;
   means responsive to said control signal for successively utilizing each set of departure data associated with said second data received address comprising, means for successively, algebraically combining the last received first position data with each of the departure data of said last named set to produce a set of resultant position data;
   and means for successively applying each of said resultant position data of said set of resultant position data to said director;
   said director responsive to said successively applied resultant position data to control said machine moving member with respect to said workpiece.

4. An arrangement according to claim 3 wherein said first position data further comprises an order address calling for a first or second order of reception of said second data;
   means responsive to reception of a first order of reception address for causing said second data receiving means to receive first in said first order until a second data address and associated departure data is received which corresponds to the last read first data address and then to receive in the second order;
   said means for producing a control signal responsive to a second data address received in said second order for producing said control signal.

5. An arrangement for controlling a machine moving member with respect to a workpiece comprising a machine director;
   means for storing a plurality of first data each comprising a block of separate offset commands representing points offset from a reference location on a workpiece, a pattern address identifying the particular pattern of machining operations to be executed, and first control commands;
   means for storing a plurality of second data each comprising an address identifying a particular pattern of machining operations and a plurality of blocks of data wherein each block comprises departure commands from an offset point, the tool to be employed, and second control commands;
   first means for reading the first of said plurality of first data and responsive to said second control commands to successively read each of the remaining of said plurality of first data;
   second means responsive to second control commands for reading said second data and executing machining operations identified by said stored second data between successive reading of said first data comprising, means responsive to a second data read pattern address corresponding to the last read first data pattern address for producing a control signal;
   means responsive to said control signal for successively utilizing each block of data in said second data which corresponds to said second data read address comprising, means for algebraically combining the last read first data offset commands with the departure commands of each block to produce a resultant offset command;
   and means for successively applying said resultant ocset command and the tool data corresponding to each block to said director;
   said director responsive to said successively applied resultant offset commands and tool data to control said machine moving member to effect the desired machining operations on said workpiece.

6. An arrangement according to claim 5 wherein said first data further comprises a direction address commanding a first or second direction in which the stored second data is to be read;

means responsive to a reading of a first direction address for causing said second data reading means to read first in said first direction until a second data pattern address and associated departure commands is read which corresponds to the last read first data pattern address and then reading in the second direction;

said means for producing a control signal responsive to a second data pattern address reading in the second direction for producing a said control signal.

7. An arrangement according to claim 5 further comprising means for storing a command signalling the end of desired machining operations;

said director responsive to last named command for terminating control action by said director.

8. In combination, means for storing a plurality of first data each comprising a block of separate offset commands representing positional locations offset from a reference location and a pattern address identifying the particular pattern of operations to be executed;

means for storing a plurality of second data each comprising an address identifying a particular pattern of operations and a plurality of blocks of data wherein each block comprises positional departures from an offset location;

means for successively reading each of said first data;

means for reading said second data and executing operations identified by said stored second data between successive readings of said first data comprising, control means for searching said second data and responsive to a second data read pattern address corresponding to the last read first data pattern address for successively utilizing each block of data in said second data which corresponds to said second data read address comprising, means for algebraically combining the last read offset commands with the positional departures of each block to produce a resultant offset command.

9. A combination according to claim 8 wherein said first data further comprises a direction address commanding the direction in which the stored second data is to be read;

means responsive to a reading of a first direction of reading address for causing said second data reading means to read first in said first direction until a second data pattern address and associated departure commands is read which corresponds to the last read first data pattern address, and then reading in the second direction;

said control means responsive to a second data pattern address reading in the second direction for successively utilizing each block of data in said second data which corresponds to said second data read address.

10. In combination, means for storing a plurality of first data each comprising separate first position data representing a respective position point and a first address calling for a particular set of departure data to be combined with said first position data;

means for storing a plurality of second data each comprising an address labelling a particular set of departure data and the corresponding set of departure data associated therewith;

means for successively reading each of said first data;

means for successively reading each of said second data for combining departure and first position data between successive receptions of said first data comprising, means responsive to a read second data address corresponding to the last received first data address for producing a control signal;

and means responsive to said control signal for successively utilizing each set of departure data associated with said second data received address comprising, means for successively, algebraically combining the last received first position data with each of the departure data of said last named set to produce a set of resultant position data.

11. A combination according to claim 10 wherein said first position data further comprises an order address calling for a first or second order of reception of said second data;

means responsive to reception of a first order of reception address for causing said second data receiving means to receive first in said first order until a second data address and associated departure data is received which corresponds to the last read first data address and then to receive in the second order;

said means for producing a control signal responsive to a second data address received in said second order for producing said control signal.

12. In combination, means for storing a plurality of first data each comprising, separate first position data representing a respective position point, a first address calling for a particular set of departure data to be combined with said first position data, and first control commands;

means for storing a plurality of second data each comprising, an address labelling a particular set of departure data, the corresponding set of departure data associated therewith, and second control commands;

first means for reading the first of said plurality of first data and responsive to said second control commands to successively read the remaining of said plurality of said first data;

second means responsive to said second control commands for successively reading each of said second data and combining departure data with first position data between successive readings of said first data comprising, means responsive to a read second data address corresponding to the last read first data address for producing a control signal;

and means responsive to said control signal for successively utilizing each set of departure data associated with said second data read address comprising, means for successively, algebraically combining the last read first position data with each of the departure data of said last named set to produce a set of resultant position data.

References Cited

UNITED STATES PATENTS

| 3,159,818 | 12/1964 | Scantlin | 340—172.5 |
| 3,291,970 | 12/1966 | Evans | 235—151.11 |
| 3,348,208 | 10/1967 | Rosener | 340—172.5 |

PAUL J. HENON, Primary Examiner

M. B. CHAPNICK, Assistant Examiner

U.S. Cl. X.R.

235—151.11